United States Patent Office
3,598,565
Patented Aug. 10, 1971

3,598,565
SEED COATING COMPOSITION
Thomas M. Graves, 4011 Roosevelt Ave.,
Richmond, Calif. 94805
No Drawing. Filed July 30, 1968, Ser. No. 748,617
Int. Cl. A01n 5/00; A01c 1/06
U.S. Cl. 71—77
9 Claims

ABSTRACT OF THE DISCLOSURE

Composition for treating seeds comprising an aqueous emulsion of a substantially water-soluble neutralized copolymer of an $\alpha,\beta$-unsaturated monocarboxylic acid and a lower alkyl acrylate and a crosslinked copolymer of vinyl acetate and a lower alkyl acrylate. These compositions enhance the germination of the seeds.

FIELD OF INVENTION

This invention relates to a novel, water-soluble seed coating composition comprising a homogeneous mixture of two copolymers.

INVENTION BACKGROUND

It is common to treat seeds with hard resins to protect the seed from damage during handling. Such coatings also afford the advantages of protecting the seeds from pest attack and smoothing the seed surface to make planting easier. In order to improve the seed germination, or the germination rate, plant nutrients are incorporated into the hard resin coating. Pesticides may be incorporated to further protect the seed from pest attack.

INVENTION DESCRIPTION

A unique seed coating composition has now been discovered which not only provides a protective coating for the seed, but also enhances its germination rate and the viability of the emerging seedling. This enhancement occurs without incorporating plant nutrients into the coating composition.

The novel coating composition of this invention comprises an aqueous emulsion of two copolymers. One copolymer is a substantially water-soluble neutralized copolymer of an $\alpha,\beta$-unsaturated monocarboxylic acid and a lower alkylacrylate. The mol proportion of neutralized acid to acrylate in these copolymers will usually range from 40:1 to about 1:1, preferably 25:1 to 4:1.

The $\alpha,\beta$-unsaturated monocarboxylic acid of the copolymer contains 3 to about 6 carbon atoms. Such acids include acrylic acid, $\alpha$-methylacrylic acid, crotonic acid, $\alpha$-methylcrotonic acid and the like. Acrylic acid and $\alpha$-methylacrylic acid are preferred. The lower alkylacrylate of the copolymer contains 4 to about 10 carbon atoms; with the acid (acrylate) moiety contributing 3 to about 6 carbon atoms to the total carbon number. Examples of such acrylates are methylacrylate, ethylacrylate, isopropylacrylate, methyl-$\alpha$-methylacrylate, ethyl-$\alpha$-methylacrylate, amyl-$\alpha$-methylacrylate, hexyl-$\alpha$-methylacrylate, methylcrotonate, butylcrotonate, methyl-$\alpha$-methylcrotonate and the like. The lower alkyl esters of acrylic acid and $\alpha$-methylacrylic acid are preferred.

The acid portion of the copolymer is neutralized with an alkaline earth metal, alkali metal or ammonium base. After neutralization the copolymer will have a pH in the range of about 5.5 to 8.5.

The second copolymer is a polyvinylacetate crosslinked with a small amount of lower alkylacrylate. The amount of lower alkylacrylate in this crosslinked copolymer will usually be not greater than 25% by weight. Usually it will be about 0.3 to 5% by weight of the second copolymer.

The lower alkylacrylate of the second copolymer contains 4 to about 10 carbon atoms; with the acid moiety contributing 3 to about 6 carbon atoms to the total carbon number. Examples of these acrylates are methylacrylate, ethylacrylate, hexylacrylate, methyl-$\alpha$-methyl acrylate, butyl-$\alpha$-methylacrylate; methylcrotonate, ethyl-$\alpha$-methylcrotonate and the like. The methyl esters of acrylic acid and $\alpha$-methylacrylic acid are preferred.

As used herein the term "lower alkyl" means alkyl of 1 to 6 carbon atoms.

The two copolymers usually comprise about 10 to 60% by weight of the aqueous emulsion. The weight ratio of the crosslinked polyvinylacetate copolymer to the $\alpha,\beta$-unsaturated acid-acrylate copolymer will be about 1:2 to about 1:10, preferably 1:3 to 1:5. The composition of this invention also contains one or more nonionic emulsifiers in amounts normally ranging between 0.5 to 5% by weight of the composition. Typical nonionic emulsifiers are the polyethenoxy ethers and esters such as the condensation products of fatty acids, alcohols or phenolics with ethylene and/or propylene oxide; esters of fatty acids and polyols; condensation products of alkylene oxides and thiols; polyoxyalkylene esters of phosphoric acid and polyhydroxy compounds such as sucrose, dextrine and the like. Such emulsifiers are described in Surface Active Agents and Detergents, Schwartz, Perry and Berch, Interscience (1958).

The emulsion may also contain pigments, pesticides and other additives. Plant nutrients may also be added; but, as indicated previously, excellent germination is effected without them.

According to this invention, the seeds are coated with the above-described composition such that when the seeds dry they are covered uniformly with a homogenous mixture of two copolymers. The coating is substantially water-soluble, hard—usually at least 3H pencil hardness—exceptionally smooth and not sticky. This coating may be applied to the seed surface by spraying or brushing. Alternatively, the seeds may be tumbled or dipped into the invention composition. The thickness of the resulting seed coating will vary with the type of seed. Usually it will range between about 0.001 and about 5 mils, preferably 0.01 to 2 mils.

The coating of this invention has been used with a variety of seeds including corn, peas, beans, wheat, sorghum, cotton, sunflower and other grain seeds. The coatings on these seeds cause them to generally germinate faster and enhance the seedling growth and viability.

EXAMPLES

The compositions of this invention and their physiological effects on seeds are illustrated by the following examples. These examples are intended to illustrate the invention described herein and are not intended to limit it in any manner. Unless indicated otherwise, percentages are by weight.

Example 1

A resin seed coating of this invention was prepared by mixing 15.5 g. of a 40% aqueous emulsion of a copolymer comprising vinyl acetate crosslinked with a small amount of lower alkyl methacrylate (sold under the name "Nacrylic 25–2813") and 84.5 g. of a 30% aqueous solution of a neutralized acrylic acid methyl methacrylate copolymer (sold under the name "Joncryl 85"). 3.88 g. of this mixture was added to 5.15 g. of an aqueous solution of 1 g. of N-(trichloromethylthio) tetrahydrophthalamide seed protectant (sold as Orthocide 75 Seed Protectant). The mixture was agitated for five minutes with a creamy suspension resulting.

100 g. of seed corn was placed in a 16 oz. jar. 1 ml. of the above-described resin seed coating was placed on top of the corn. The bottle was sealed and swirled for 2 minutes. The seeds were spread out and allowed to dry for 5 minutes.

The resulting seed coating was uniform, non-dusty and had a thickness of about 0.2 ml. The coating was completely soluble in water.

The seeds were germinated in dishes lined with filter paper and along with comparison seeds treated only with the N-(trichloromethylthio) tetrahydrophthalimide seed protectant and water at the same rate.

The seeds were watered with 10 ml. of water initially. At the end of 2 and 5 days the hypocotyl and epicotyl growths were measured in millimeters and compared. Based on these measurements the resin treated seeds showed about an 18% better growth than the comparison seeds after 2 days and about a 31% better growth after 5 days.

The root systems were carefully clipped from each seed and weighed. The resin treated seed clippings showed a weight increase of about 17% after 5 days, over the comparison seed clippings.

Example 2

100 g. of bean seeds was placed in a 16 oz. jar. 1 ml. of the resin seed coating of Example 1 was placed on top of the beans. The bottle was sealed and swirled for 2 minutes. The seeds were spread out and allowed to dry for 5 minutes.

The resulting seed coating was uniform, non-dusty and had a thickness of about 0.4 ml. The coating was completely soluble in water. These bean seeds and comparison bean seeds were germinated as in Example 1. At the end of 2 and 5 days the root systems were measured in millimeters. These measurements showed the resin treated seeds had about 50% better growth than the comparison seeds after 2 days and about 50% better growth after 5 days. The resin treated seed clippings showed a weight increase of about 47% after 5 days over the comparison seed clippings.

Example 3

100 g. of wheat seed was placed in a 16 oz. jar. 1 ml. of the resin seed coating of Example 1 was placed on top of the wheat. The bottle was sealed and swirled for 2 minutes. The seeds were spread out and allowed to dry for 5 minutes. The resulting seed coating was uniform and had a thickness of about 0.05 ml. The coating was completely soluble in water.

These seeds and comparison seeds were germinated as in Example 1. At the end of 5 and 10 days hypocotyl and epicotyl growths were measured in millimeters. These measurements showed that the resin treated seeds had about 10% better growth than the comparison seeds after 5 days and about 11% better growth after 10 days.

As will be evident to those skilled in the art, various modifications on this invention can be made or followed, in the light of the foregoing disclosure and discussion, without departing from the spirit or scope of the disclosure or from the scope of the following claims.

I claim:

1. Composition for treating seeds comprising an aqueous emulsion of 10 to 60 weight percent of (1) a substantially water-soluble neutralized copolymer of an $\alpha,\beta$-unsaturated monocarboxylic acid of 3 to about 6 carbon atoms and a lower alkyl acrylate of 4 to about 10 carbon atoms, and (2) a crosslinked copolymer of vinyl acetate and a lower alkyl acrylate of 4 to about 10 carbon atoms, the weight ratio of the crosslinked copolymer to the water-soluble neutralized copolymer being in the range of about 1:2 to about 1:10.

2. The composition of claim 1 wherein the $\alpha,\beta$-unsaturated monocarboxylic acid is acrylic acid or $\alpha$-methylacrylic acid, the lower alkyl acrylate of the substantially water-soluble copolymer is a lower alkyl ester of acrylic acid or a lower alkyl ester of $\alpha$-methylacrylic acid and the lower alkyl acrylate of the crosslinked copolymer is the methyl ester of acrylic acid or the methyl ester of $\alpha$-methylacrylic acid.

3. The composition of claim 1 wherein the mol proportion of $\alpha,\beta$-unsaturated monocarboxylic acid to lower alkyl acrylate of the substantially water-soluble copolymer is in the range of 40:1 to about 1:1 and the amount of lower alkyl acrylate in the crosslinked copolymer is less than 25% by weight.

4. The composition of claim 1 wherein the mol proportion of $\alpha,\beta$-unsaturated monocarboxylic acid to lower alkyl acrylate of the substantially water-soluble copolymer is in the range of 25:1 to 4:1 and the amount of lower alkyl acrylate in the crosslinked copolymer is in the range of about 0.3 to 5% by weight.

5. The composition of claim 1 wherein the weight ratio of the crosslinked copolymer to the substantially water-soluble neutralized copolymer is in the range of 1:3 to 1:5.

6. Method for enhancing the germination of seeds and the viability of seedlings of said seeds which comprises coating said seeds with a substantially water-soluble homogeneous resin mixture of (1) a substantially water-soluble neutralized copolymer of an $\alpha,\beta$-unsaturated monocarboxylic acid of 3 to about 6 carbon atoms and a lower alkyl acrylate of 4 to about 10 carbon atoms, and (2) a crosslinked copolymer of vinyl acetate and a lower alkyl acrylate of 4 to about 10 carbon atoms, the weight ratio of the crosslinked copolymer to the water-soluble neutralized copolymer being in the range of about 1:2 to about 1:10.

7. The method of claim 6 in which the $\alpha,\beta$-unsaturated monocarboxylic acid is acrylic acid or $\alpha$-methylacrylic acid, the lower alkyl acrylate of the substantially water-soluble copolymer is a lower alkyl ester of acrylic acid or a lower alkyl ester of $\alpha$-methylacrylic acid and the lower alkyl acrylate of the crosslinked copolymer is the methyl ester of acrylic acid or the methyl ester of $\alpha$-methylacrylic acid.

8. Composition for treating seeds comprising an aqueous emulsion of 10–60 weight percent of (1) a substantially water-soluble neutralized copolymer of an $\alpha,\beta$-unsaturated monocarboxylic acid of 3 to about 6 carbon atoms and a lower alkyl acrylate of 4 to about 10 carbon atoms with the acid moiety of the lower alkyl acrylate contributing 3 to 6 carbon atoms of the total number, the mole portion of the $\alpha,\beta$-unsaturated monocarboxylic acid to lower alkyl acrylate being in the range of about 40:1 to about 1:1, and (2) a crosslinked copolymer of vinyl acetate and a lower alkyl acrylate of 4 to about 10 carbon atoms with the acid moiety of the lower alkyl acrylate contributing 3 to 6 carbon atoms of the total number, the amount of lower alkyl acrylate in the crosslinked copolymer being less than 25 weight percent, the weight ratio of the crosslinked copolymer to the water-soluble neutralized copolymer being in the range of 1:2 to about 1:10.

9. The composition of claim 8 containing a nonionic emulsifier in the amount of 0.5 to 5 weight percent.

References Cited

UNITED STATES PATENTS 3,113,399  12/1963  Eversole et al. _____ 47—57.6
3,212,967  10/1965  McFadden et al. _____ 424—78

LEWIS GOTTS, Primary Examiner

C. L. MILLS, Assistant Examiner

U.S. Cl. X.R.

71—Dig. 1; 47—57.6